C. STETEFELDT.

Assignor, by mesne assignments, to STETEFELDT FURNACE CO.

Ore-Roasting Furnace.

No. 8,266. Reissued May 28, 1878.

*WITNESSES:*

C. Clarence Poole

W. H. Morsell

*INVENTOR:*

Charles Stetefeldt per atty. A. H. Evans & Co

UNITED STATES PATENT OFFICE.

CHARLES STETEFELDT, OF SAN FRANCISCO, CALIFORNIA, ASSIGNOR, BY MESNE ASSIGNMENTS, TO STETEFELDT FURNACE COMPANY.

IMPROVEMENT IN ORE-ROASTING FURNACES.

Specification forming part of Letters Patent No. 72,931, dated December 31, 1867; Reissue No. 3,807, dated January 25, 1870; Reissue No. 8,165, dated April 9, 1878; Reissue No. 8,266, dated May 28, 1878; application filed May 23, 1878.

*To all whom it may concern:*

Be it known that I, CHARLES STETEFELDT, of the city and county of San Francisco, State of California, have invented Improvements in Furnaces for Chloridizing Silver Ores; and I do hereby declare the following to be a full, clear, and exact description thereof, reference being had to the accompanying drawings.

My invention is intended to provide improvements in furnaces for chloridizing silver ores preparatory to amalgamation.

This furnace is constructed with a shaft, heated by a fire-place, the flames of which enter near its bottom through which the pulverized ore, mixed with salt, drops, retarded in its fall by the upward motion of the heated air and gases.

The flames, passing up the shaft, heat the particles of the falling ore, effecting their perfect desulphurization and chlorination, which latter is to a great extent achieved by the chlorine, hydrochloric acid, and volatile chlorides, which continue to emanate from the roasted ore accumulated at the bottom of the shaft. A flue near the top of the shaft allows the gases to pass into a series of dust-chambers connected with a chimney.

As the ore has to be pulverized very fine preparatory to amalgamation or other processes of extraction, a part of it will be necessarily carried by the draft directly through the flue into the dust-chambers, and is consequently either entirely raw, or, at least, imperfectly roasted, not having been exposed to a sufficient degree of heat.

To effect a perfect roasting and chlorination of this part of the ore, an auxiliary fire-place is connected with the flue through which the dust passes, and, as the ore is so very fine, and in an atmosphere of chloridizing-gases, its chlorination is completed in a moment in passing the flame from the auxiliary fire-place.

To more fully illustrate and describe my furnace, reference is had to the accompanying drawings and letters marked thereon, of which—

Figure 1:
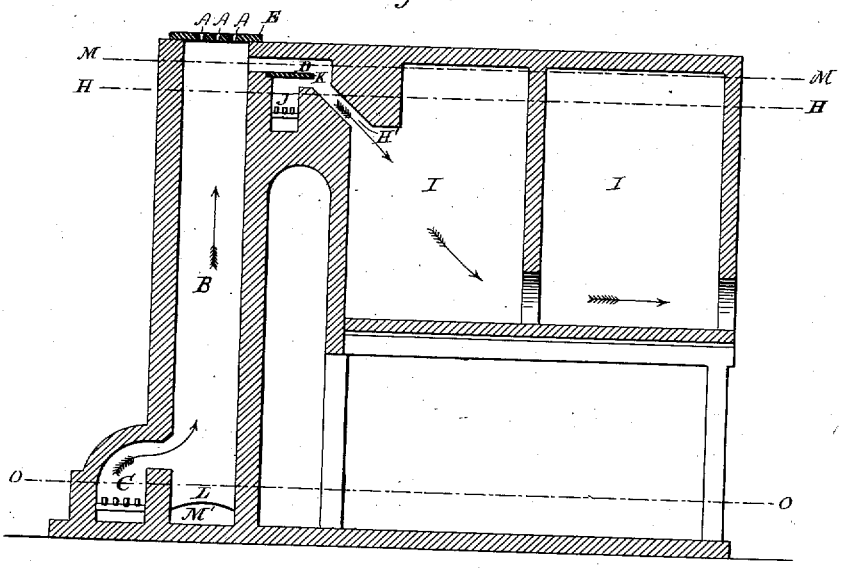
Figure 2:
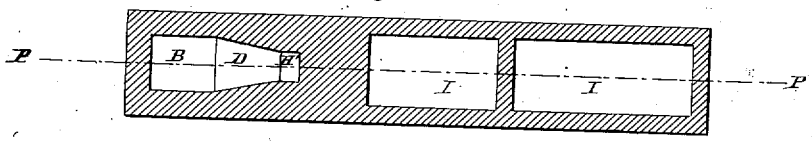
Figure 3:
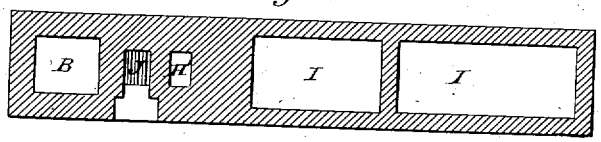
Figure 4:
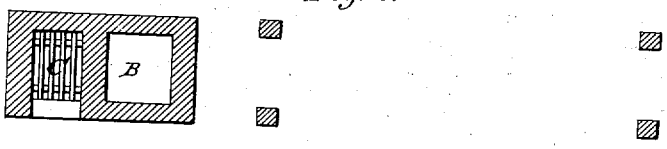

Figure 1 is a section taken through P P. Fig. 2 is a section taken through M M. Fig. 3 is a section taken through H H. Fig. 4 is a section taken through O O.

B represents the perpendicular shaft of the furnace, covered at the top with an iron plate, E, having slits *a a a*, through which the pulverized ore is continuously fed by machinery.

C is a fire-place, near the lower end of the shaft, from which the flames and gases pass up the shaft B, and through the flue D and H′ into the dust-chambers I I.

M′ is a discharge-door, through which the roasted ore is drawn out which accumulates in the lower part L of the shaft B.

J is the auxiliary fire-place, covered by the arch K, and opening into the flue H′. Here the ore is roasted which is too fine to fall down the shaft B.

The operation of my furnace is as follows, to wit: Fire is made in the fire-places C and J, and as soon as the furnace is hot the feeding machinery is put in motion, and the ore is fed in a continuous stream. The only attention which the furnace requires is the keeping up of a regular roasting heat. The roasted ore is allowed to accumulate at the bottom of the shaft nearly up to the fire-bridge of the fire-place C. This is very important, as a great amount of chlorine, hydrochloric acid, and volatile chlorides emanate from the charge and act upon the falling ore. The roasted ore is discharged through the floor M′. The ore which is roasted in the flue H′ by the heat from the auxiliary fire-place J and deposited in the dust-chambers I I is taken out from them occasionally.

What I claim as my invention, and desire to secure by Letters Patent of the United States, is—

1. The combination of a shaft, vertical, or nearly so, with a fire-place at or near the bottom, a flue leading from the upper part of the shaft, and an auxiliary fire-place for heating said flue.

2. An auxiliary fire-place connected with a flue or chamber, through which the dust passes, escaping from a roasting-furnace, for the purpose of roasting and chloridizing said dust.

3. A supplemental or auxiliary fire-place, J, combined with a furnace, B, fire-place C, dust-flue D and H′, and dust-chambers I I, said auxiliary fire-place being arranged to roast and chloridize the fine ore which is carried out of the furnace B after it has left the main furnace-chamber.

CHARLES STETEFELDT.

Witnesses:

MORRIS M. ESTER,

WM. D. HARRISON.